United States Patent [19]

Gobran

[11] 4,039,724
[45] Aug. 2, 1977

[54] POLY(PHENOL/DIENE) RESIN AND RUBBER ADHESIVE COMPOSITIONS TACKIFIED THEREWITH

[75] Inventor: Ramsis Gobran, Roseville, Minn.

[73] Assignee: Minnesota Mining and Manufacturing Company, St. Paul, Minn.

[21] Appl. No.: 604,927

[22] Filed: Aug. 15, 1975

Related U.S. Application Data

[62] Division of Ser. No. 408,584, Oct. 23, 1973, Pat. No. 3,944,523.

[51] Int. Cl.² .................. B32B 27/08; C08L 9/00
[52] U.S. Cl. ........................................... 428/525; 260/5;
260/859 R; 260/887; 260/897 B; 260/897 C;
428/521
[58] Field of Search .............. 260/887, 897 B, 897 C,
260/892, 5, 859 R, 890; 428/525, 521

[56] References Cited

U.S. PATENT DOCUMENTS

| | | |
|---|---|---|
| 3,124,555 | 3/1964 | Bown et al. ............................ 260/62 |
| 3,491,167 | 1/1970 | Soldatos ................................. 260/62 |
| 3,625,874 | 12/1971 | Cottman et al. ...................... 260/887 |

*Primary Examiner*—J. Ziegler
*Attorney, Agent, or Firm*—Cruzan Alexander; Donald M. Sell; Richard Francis

[57] ABSTRACT

Non-conjugated dienes are reacted with phenolic compounds in the presence of a Friedel-Crafts catalyst to produce poly(phenol/diene) copolymer resin having repeating alternate phenol and diene units, a number average molecular weight of 600 – 5000 and a glass transition temperature of 100°– 220° C. The resin, and its partially or fully hydrogenated counterpart, can be blended with various rubbery polymers to provide adhesive compositions having improved adhesive tack.

4 Claims, No Drawings

POLY(PHENOL/DIENE) RESIN AND RUBBER ADHESIVE COMPOSITIONS TACKIFIED THEREWITH

CROSS-REFERENCE TO RELATED APPLICATIONS

This is a division of copending application Ser. No. 408,584, filed Oct. 23, 1973 now U.S. Pat. No. 3,944,523.

BACKGROUND OF THE INVENTION

The present invention relates to polymeric resinous products produced by reacting phenolic compounds with dienes. In another aspect, the invention relates to adhesive compositions tackified with the resinous products.

Low molecular weight reaction products of phenols and dienes are known. U.S. Pat. No. 3,336,398, for example, discloses such a resin that has a molecular weight of 300 – 400, indicating that it is no more than a ternary adduct, and U.S. Pat. No. 2,471,454 teaches dihydroterpene-substituted phenol monomers rather than polymer products. Such monomeric products are not useful as tackifiers due to their low molecular weight.

U.S. Pat. No. 2,864,868 discloses the reaction of conjugated dienes with phenols to produce hard, dark resinous products having blocks of polymerized diene rather than alternately repeating diene and phenol units.

SUMMARY OF THE INVENTION

The present invention provides novel phenol/diene copolymer resins that are especially useful as tackifiers for rubbery polymers in adhesive compositions. The copolymer resins are produced by reacting certain phenolic compounds with non-conjugated dienes in the presence of a Friedel-Crafts catalyst. The resultant copolymers have repeating alternate diene and phenol units, a number average molecular weight in the range of 600 – 5000, and a glass transition temperature in the range 100° – 220° C. (The phrase "average molecular weight" as hereinafter used designates the number average molecular weight unless otherwise specified.) It has been discovered that such copolymer resins blend quite well with any of a wide variety of rubbery materials that are normally used as base materials for pressure sensitive adhesives, and when so blended, impart adhesive tack to these materials.

Lower molecular weight products of this type, i.e., those copolymers having a molecular weight of less than 600, may adequately tackify certain adhesive compositions but they soon ooze therefrom due to their softness. Higher molecular weight products, i.e., those having a molecular weight above 5000, will not blend well with the rubber base materials normally used to make the adhesive compositions.

The non-conjugated dienes used in the reaction to produce the copolymers of the invention are organic compounds characterized by having at least two loci of unsaturation, e.g., two double bonds, that are separated by a saturated moiety which effectively prevents conjugation. Suitable dienes of this type include dicyclopentadiene, 4-vinylcyclohexene-1, dipentene, 1,5-cyclooctadiene, etc. Other compounds which have more than two loci of unsaturation can also provide useful reactants, provided conjugation is not present. These compounds include trienes such as 1,5,9-cyclododecatriene and others.

The phenolic reactant must have at least two ring carbon atoms susceptible to alkylation. Phenolic compounds suitable for the reaction include phenol, monoalkyl substituted phenols such as cresol, propyl phenols, butyl phenols, amyl phenols, etc., dialkyl substituted phenols such as 2,3-dimethyl phenol and 2,5-dimethyl phenol, phenolic ethers such as anisole, monoalkyl substituted anisoles such as 2-methyl anisole and 4-methyl anisole, and dialkyl substituted anisoles such as 2,3-dimethyl anisole, and 2,5-dimethyl anisole, and others.

The reaction is carried out in the presence of a Friedel-Crafts catalyst such as an acid, e.g., hydrofluoric acid, sulfuric acid, or phosphoric acid, or a Lewis acid such as aluminum chloride, aluminum bromide, boron trifluoride, boron trifluoride ether and acid complexes, beryllium chloride, ferric chloride, zinc chloride, etc. Boron trifluoride and the ether and acid complexes thereof are the preferred catalysts.

The amount of catalyst required, functionally stated, is that amount sufficient to cause the reaction to go to completion producing a copolymer resin product having a molecular weight in the range 600 – 5000. This amount will generally be about 1 – 3% of weight of the reactants, exclusive of the weight of the catalyst. Less than about 1% by weight catalyst may produce a product having an undesirably low molecular weight, i.e., lower than 600 which, as previously stated may ooze from an adhesive composition. Greater than about 3% by weight catalyst produces a product having a relatively high molecular weight, although it should be noted that the higher molecular weight products are useful as tackifiers up to a molecular weight of 5000.

In the reaction, the phenolic compound should be employed in an amount of 1 to 1.75 mole per mole of diene. At less than one mole of phenolic compound per mole of diene products are incompatible with many rubber base materials. At greater than 1.75 mole of phenolic compound per mole of diene the product has a low molecular weight (e.g., less than about 500) and hence is too soft to be used as a tackifier.

It has been found that the order of adding the reactants is important to produce the desired product. The phenolic compound should always be in an excess during the reaction, else homopolymerization of the diene results rather than production of a phenol/diene copolymer having repeating alternating phenol and diene units. An excess of phenolic compound can be maintained by charging the reaction vessel therewith, adding the catalyst, and then slowly adding the diene with sufficient agitation to cause rapid dispersal.

The reaction can be carried out at atmospheric pressure but care should be taken to substantially exclude moisture, e.g., purging the reaction vessel with a dry inert gas. The preferred reaction atmosphere is dry argon or nitrogen.

For convenience in handling and reaction control, the reactants may be mixed with an inert liquid reaction medium at about 10 to 40 parts by weight reactants per 100 parts total (reaction medium plus reactants), preferably at about 15 to 30 parts per 100. The preferred reaction medium is also a solvent for at least one of the reactants. Exemplary reaction media include aromatic hydrocarbons such as toluene and xylene, aliphatic hydrocarbons such as heptane and hexane, and halogenated hydrocarbons such as chlorobenzene and dichlorobenzene.

The reaction temperature is maintained preferably between room temperature (about 20° C.) and 130° C.

although slightly higher and slightly lower temperatures may also be effective. At temperatures above about 135° C. chemical modification of some dienes will occur; therefore, temperatures substantially above 135° C. should be avoided where appropriate.

The most convenient method of accomplishing the reaction is to charge the phenolic compound, reaction medium (if used) and catalyst into a suitable reaction vessel --and, with mixing, dropwise add the diene. The reaction will be exothermic and care should be taken to maintain the reaction mixture at a temperature of less than about 130° C. Such a result can easily be accomplished by very slow addition of diene or by cooling the reaction vessel contents. After the addition of the diene is completed, heating at about 130° C. and agitation are continued until the reaction is complete. Reaction completion is generally achieved within 2 - 4 hours.

Once the reaction is complete, the product can be isolated, for example, by distillation of catalyst, reaction medium (if used), unreacted materials, and low molecular reaction products. Non-volatile catalyst or residues can be removed by methods known in the art, e.g., extraction, or they may be left in the product, if they are inert (or can be rendered inert) with respect to the materials with which they will be eventually used.

The copolymer product is a friable light amber resin which has a molecular weight in the range of 600 to 5000 (most preferably 800 to 2000) and a glass transition temperature in the range of 100° to 220° C., most preferably 100° to 170° C.

The copolymer resins of the invention can be used as prepared to tackify rubbers such as polychloroprene, chlorinated rubber and poly(ethylene/propylene) rubber. Commercially available forms of the rubbers include chlorinated ethylene-propylene rubber such as that sold under the trade designation "Nordel 1070," chlorosulfonated polyethylene such as that sold under the trade designation "Hypalon 20," and polychloroprenes such as that sold under the trade designations "Neoprene" "AC", "W", and "WHV".

The copolymer resins of the invention are blended into these rubbers by using conventional rubber compounding equipment and techniques, generally at about 5 to 200 parts by weight copolymer per 100 parts rubber, preferably about 40 to 100 parts tackifier per 100 parts rubber.

As previously stated, the phenol/diene copolymer resin will itself impart improved tack to certain polymers to make them suitable for use as pressure sensitive adhesives. It has also been discovered that when these resins are partially or fully hydrogenated, the hydrogenated products thereof also provide useful tackifiers for rubbery materials which are not easily tackified by the unhydrogenated product. In the partially hydrogenated products, at least half, but not substantially all, of the hydrogenatable carbon atoms are hydrogenated. The hydrogenable carbon atoms are the olefinic carbon atoms and carbon atoms bearing hydroxyl groups. Preferably from about 50 - 60 percent of the hydrogenatable carbon atoms are hydrogenated in the partially hydrogenated products.

Hydrogenation can be achieved by reacting the phenol/diene copolymer, in a suitable hydrogenation reaction medium (if desired) in a hydrogen atmosphere in a suitable hydrogenation catalyst. The hydrogenation temperature can vary between about 50° C. and 275° C., although temperatures in the range 100° C. to about 250° C. are preferred. A hydrogen gas pressure of from about 500 to about 4000 psig (preferably 1000 - 2500) will produce an adequate rate of hydrogenation.

The hydrogenation reaction vessel should be capable of withstanding the hydrogenation temperature and pressure and is constructed as a material that is non-reactive with the starting materials and product. Such vessels are generally made of stainless steel. The vessel should be fitted with a stirrer to agitate the starting materials, a temperature sensing device to observe the hydrogenation reaction temperature, an inlet line to introduce hydrogen into the vessel, a valve on the inlet line, an exhaust line with a valve to vent the vessel after the hydrogenation reaction is completed, and a pressure sensing device to observe the hydrogen pressure.

Hydrogenation is achieved by first purging the hydrogenation reaction vessel with a dry inert gas such as nitrogen, and then charging it with the phenol/diene copolymer, reaction medium, and catalyst, sealing the vessel, commencing stirring, pressurizing the vessel with hydrogen, heating to the appropriate temperature, and continuing to heat (and to stir) the vessel until the reaction is complete. The time required is generally about 2 - 24 hours but this may vary. Partial hydrogenation may be achieved at shorter hydrogenation reaction times (e.g., 0.1 - 3 hours) while substantially complete hydrogenation requires longer reaction times (e.g., 2 - 24 hours).

Useful hydrogenation reaction media include saturated hydrocarbon liquids such as cyclohexane, heptane, etc. The weight ratio of reaction medium to copolymer plush catalyst will generally be from about 1:1 to about 10:1 or higher.

The preferred hydrogenation catalyst is Raney nickel although others (e.g., platinum, ruthenium, nickel complexes with aluminum, e.g., nickel 2-ethyl hexanoate/-diethyl aluminum reaction product and amines, etc.) may also be useful.

The partially hydrogenated product is a white friable solid which likewise has a glass transition temperature in the range of 100° to 220° C. and an average molecular weight in the range of about 600 to 5000. The partially hydrogenated product is extremely compatible with polyurethane rubbers and when blended therewith provide novel tackified polyurethane pressure sensitive adhesive compositions. A useful polyurethane rubber is prepared by reacting a block copolymer of ethylene glycol and propylene glycol with polytetramethylene ether glycol capped with tolylene diisocyanate, and lead octoate catalyst, until essentially all traces of isocyanate functionality are absent, and then reacting this reaction product with trimethylol propane capped with tolylene diisocyanate. Other useful polyurethane resins are well known in the art.

The substantially completely hydrogenated product is extremely compatible with and will tackify natural rubber such as milled pale crepe natural rubber, cis-polybutadiene rubber such as that sold under the trade designation "Ameripol CB220," styrenebutadiene rubber such as that sold under the trade designation "Shell SBR 1011," block copolymers such as the block copolymer of styrene and isoprene such as those sold under the trade designations "Kraton 1107" and "1108", and block copolymers of styrene and butadiene such as "Kraton 1101," and ethylene/propylene rubbers. These rubbers are generally well known.

Understanding of the invention will be further facilitated by referring to the subsequent examples, which indicate, without thereby limiting, ways in which the invention may be practiced.

EXAMPLE 1

A five liter resin flask, fitted with a mechanical stirrer, a dropping funnel, a thermometer, a purge gas inlet, and a reflux condenser protected from the atmosphere by a calcium chloride drying tube, was first purged with dry argon to eliminate atmospheric contamination, and the gas flow thereafter maintained at a rate sufficient to preclude such contamination. Four moles (600.8 g.) p-t-butylphenol was then charged into the flask and heated therein to about 100° C. Thereafter 15.2 ml. $BF_3(CH_3COOH)_2$ was added in one batch with sufficient agitation to produce a homogeneous mixture. Next, 4 moles (528.8 g.) dicyclopentadiene was slowly added through the dropping funnel over a 1½ hour period of time, maintaining the resultant exotherm at about 120° C. Upon completion of the addition of the diene, the contents of the flask were heated to about 130° C. and maintained at that temperature for an additional 4 hours to complete the reaction. After about one hour of the latter heating period had elapsed, about 220 g. of dry xylene were added to facilitate stirring of the flask contents.

Upon completion of the reaction, the reflux condenser and the dropping funnel were removed and the reaction flask was fitted for distillation. The xylene, catalyst, unreacted starting materials, and low boiling byproducts were distilled off at a pressure of 2 – 3 mm of Hg with heating to 250° C., leaving a honeylike resinous product in the reaction flask. This product was poured into an open container lined with a non-adherent material and allowed to cool therein to room temperature, leaving 1080 g. (96% yield) of an amber friable material which fractured as it cooled.

Table I below, relating to Examples 1-22, reveals some pertinent physical properties of the resin prepared above and of other resins prepared in the same manner of the reactants shown.

In the tables below, "$\overline{M}_n$" denotes the number average molecular weight; "$\overline{M}_w$" denotes the weight average molecular weight; "P" denotes the ratio of $\overline{M}_w/\overline{M}_n$; and "$T_g$" denotes the glass transition temperature. $\overline{M}_n$ and $\overline{M}_w$ are determined by gel permeation chromatography utilizing a "Waters Associates Inc." Gel Permeation Chromatography. $T_g$ is determined by differential thermal analysis utilizing an "E. I. duPont de Nemours Co." differential thermal analysis (DTA) device by the method described by Maurer in Rubber Chem. and Tech., v. 42, No. 1, (1969), the chapter entitled "Applications of Differential Thermal Analysis and Thermogravimetric Analysis to Elastomer Systems".

TABLE I

| Ex. | Reactants and Quantities Thereof | | | | Catalyst and Quantity Thereof | | $\overline{M}_n$ | $\overline{M}_w$ | P | $T_g$(° C) |
|---|---|---|---|---|---|---|---|---|---|---|
| | Diene | Mole | Phenolic Compound | Mole | | | | | | |
| 1 | dicyclopentadiene | 1 | p-t-butylphenol | 1 | $BF_3(CH_3COOH)_2$ | 2% | 1270 | 2100 | 1.65 | |
| 2 | " | 1 | " | 1.25 | " | " | 1040 | 1720 | 1.65 | 118 |
| 3 | " | 1 | " | 1.30 | " | " | 930 | 1480 | 1.59 | |
| 4 | " | 1 | " | 1.35 | " | " | 940 | 1490 | 1.59 | |
| 5 | " | 1 | " | 1.40 | " | " | 900 | 1280 | 1.43 | |
| 6 | " | 1 | " | 1.50 | " | " | 922 | 1360 | 1.48 | |
| 7 | " | 1 | " | 1.60 | " | " | 880 | 1220 | 1.39 | |
| 8 | " | 1 | " | 1.75 | " | " | 850 | 1160 | 1.36 | |
| 9 | " | 1 | " | 2 | " | " | 800 | 1030 | 1.29 | 96 |
| 10 | bis(2-cyclopentenyl) ether | 1 | " | 1.35 | " | " | | | | |
| 11 | dipentene | 1 | " | 1.5 | " | " | | | | |
| 12 | 1,5-cyclooctadiene | 1 | " | 1.5 | " | " | | | | |
| 13 | dicyclopentadiene | 1 | p-t-amylphenol | 1.25 | $BF_3(CH_3COOH)_2$ | 2% | 1000 | 1640 | 1.65 | 96 |
| 14 | " | 1 | " | 1 | " | " | 1250 | 2600 | 2.13 | 122 |
| 15 | " | 1 | " | 1.20 | " | " | | | | |
| 16 | " | 1 | p-(t-butyl)phenol | 1.25 | " | " | | | | 118 |
| 17 | " | 1 | " | 1.35 | " | 1.6% | 758 | 968 | 1.28 | |
| 18 | " | 1 | " | " | " | 1.8% | 830 | 1100 | 1.33 | |
| 19 | " | 1 | " | " | " | 2% | 922 | 1360 | 1.48 | |
| 20 | " | 1 | " | " | " | 2.2% | 883 | 1240 | 1.40 | |
| 21 | " | 1 | " | " | " | 2.4% | 913 | 1300 | 1.42 | |
| 22 | " | 1 | " | " | " | 2.6% | 864 | 1210 | 1.40 | |

Hydrogenated copolymer resins according to the invention were prepared by dissolving copolymer resins at about 20% solids in cyclohexane, charging the solution into a stainless steel hydrogenation reaction vessel fitted with a thermocouple, pressure gauge, stirrer, hydrogen gas inlet, and exhaust valve, adding Raney nickel catalyst (0.1 g. per gram of resin), sealing the vessel, and pressurizing with about 1200 – 2500 psi of hydrogen gas. Thereafter the reaction vessel was heated to 250° C. with stirring to produce the desired degree of hydrogenation. Hydrogenated products (Examples 23-28) are shown in Table II below.

TABLE II

| | Hydrogenated Products | | | | | | | | | |
|---|---|---|---|---|---|---|---|---|---|---|
| Ex. No. | Reactants and Quantities Thereof | | | | Catalyst and Quantity Thereof | | $\overline{M}_n$ | $\overline{M}_w$ | P | Hydrogenation % |
| | Diene | Mole | Phenolic Compound | Mole | | | | | | |
| 23 | dicyclopentadiene | 1 | p-(t-butyl) phenol | 1.35 | $BF_3(CH_3COOH)_2$ | 2% | 980 | 1570 | 1.60 | 27 |
| 24 | " | 1 | " | " | " | " | 920 | 1470 | 1.60 | 44 |
| 25 | " | 1 | " | " | " | " | 840 | 1340 | 1.60 | 62 |
| 26 | " | 1 | " | " | " | " | 800 | 1240 | 1.56 | 86 |
| 27 | " | 1 | " | " | " | " | 780 | 1230 | 1.57 | 95 |
| 28 | " | 1 | " | " | " | " | 760 | 1180 | 1.55 | 99+ |
| 29 | " | 1 | " | 1 | " | " | 910 | 1580 | 1.73 | " |
| 30 | " | 1 | " | 1.25 | " | " | 875 | 1370 | 1.57 | " |
| 31 | " | 1 | " | 1.5 | " | " | 750 | 1100 | 1.46 | " |
| 32 | " | 1 | " | 1.75 | " | " | 754 | 1065 | 1.41 | " |
| 33 | " | 1 | " | 2 | " | " | 670 | 890 | 1.33 | " |

The above-described copolymer resins were used to tackify various rubbery base materials as hereinbelow described.

The results of the evaluation are shown in Table III below.

TABLE III

| | | Open Time | | | | | | | |
|---|---|---|---|---|---|---|---|---|---|
| | | 5 Minutes | | | 15 Minutes | | | 30 Minutes | | |
| Ex. | Copolymer Resin | Knitting | Strength | Delamination | Knitting | Strength | Delamination | Knitting | Strength | Delamination |
| 34 | Example 13 | good | poor | no | good | poor | no | fair | fair | no |
| 35 | Example 14 | good | poor | yes | good | good | yes | good | good | yes |
| 36 | Ex. 13:14 (50:50) | good | poor | yes | good | good | yes | good | good | yes |

Copolymer resins were evaluated as tackifiers for structural adhesives by spraying one major surface of each of a 1 ft. sq. section of birch plywood and a 1 ft. sq. section of "Formica" plastic sheeting uniformly with an adhesive composition consisting of 40 parts by weight copolymer resin and 100 parts by weight polychloroprene rubber (sold under the trade designation "Neoprene AC") dissolved in heptane, providing approximately 3 to 3.5 gms. per sq. ft. of dried adhesive on each surface. Thereafter, 4 inch × 4 inch samples were cut from each and bonded together by joining the adhesive covered surfaces using light pressure (about 1 lb. per 61 sq. in.) after 5, 15, and 30 minutes, respectively, of "open time". (Open time is the amount of time elapsed after the adhesive solution is sprayed upon a surface.) After bonding, the bonded parts were separated and subjective evaluations were made of the "knitting," "strength," and "delamination."

Knitting is the ability of an adhesive to form strings as the adhered surfaces are separated. An adhesive which has good knitting will form uniform strings uniformly between the surfaces. Fair knitting implies some gaps are left without strings and/or the strings are not uniform. Poor knitting means little or no stringing of the adhesive has occurred. Strength is a subjective indication of the amount of force required to separate the adhered surfaces. Poor strength implies a weak bond; good strength a strong bond. Delamination of the plywood is a further indication of the strength of the bond between the adhered surfaces. A very strong bond causes the plywood to delaminate.

Copolymer resins were evaluated as tackifiers in pressure sensitive adhesive compositions for adhesive coated tapes by dissolving the copolymer resin in a solvent such as heptane and then dissolving a rubber base material in the resin solution to form a homogeneous blend, forming approximately a 20% solids solution therein, and coating the solution on 2 mil polyester film to provide a dried coating thickness of 2 mils. Thereafter, the coated film was examined and subjective evaluation of film appearance, quality of film, and tack were determined.

In an adhesive coated transparent tape, it is desired to have a clear rather than a hazy film appearance. Likewise, the film should not be cracked or show other signs of discontinuity. Additionally, the pressure sensitive adhesive should be tacky without being unduly soft.

The terms "tacky", "some tack" and "nil" relate to the degree of tack noted when a hand-held 1.6 mm diameter stainless steel probe was touched to the surface of a 4 by 6 inch by 1 mil adhesive layer on a 1 mil polyester sheet, as the probe is withdrawn. Tacky means the entire sheet was lifted and remained on the end of the probe. Some tack means the sheet was lifted slightly but it subsequently fell off the end of the probe. Nil means the sheet was not lifted by the probe. (Comparison with tack measurements determined by ASTM Method D2979-71 reveals adhesives found to be tacky by the abovedescribed test have withdrawal force values from 35 to 110 grams.)

The subjective evaluations of the pressure sensitive adhesives are shown in Table IV below.

TABLE IV

| Ex. No. | Rubber Base Material | Resin Ex. No. | Amount of Resin (as Parts Resin per 100 Parts Rubber) | Film Appearance | Quality of Film | Tack |
|---|---|---|---|---|---|---|
| 37 | natural rubber | 29 | 30 | clear | good | tacky |
| 38 | " | " | 40 | " | " | " |
| 39 | " | " | 50 | " | " | " |
| 40 | cis-polybutadiene | " | 30 | slight haze | few cracks | " |
| 41 | " | " | 40 | " | " | " |
| 42 | " | " | 50 | " | " | some tack |
| 43 | natural rubber | 30 | 30 | clear | good | tacky |
| 44 | " | " | 40 | " | " | " |
| 45 | " | " | 50 | " | " | " |
| 46 | cis-polybutadiene | " | 30 | " | " | " |
| 47 | " | " | 40 | " | " | " |
| 48 | " | " | 50 | " | " | " |
| 49 | natural rubber | 31 | 30 | " | " | " |
| 50 | " | " | 40 | " | " | " |
| 51 | " | " | 50 | " | " | " |
| 52 | cis-polybutadiene | 31 | 30 | clear | good | tacky |
| 53 | " | " | 40 | " | few cracks | some tack |
| 54 | " | " | 50 | " | " | " |
| 55 | natural rubber | 32 | 30 | " | good | tacky |
| 56 | " | " | 40 | " | " | " |
| 57 | " | " | 50 | " | " | " |
| 58 | cis-polybutadiene | " | 30 | " | " | " |
| 59 | " | " | 40 | " | " | " |
| 60 | " | " | 50 | " | " | " |
| 61 | natural rubber | 27 | 30 | " | good | some tack |
| 62 | " | " | 40 | " | " | tacky |
| 63 | " | " | 50 | " | " | tacky-soft |
| 64 | styrene-butadiene rubber | " | 30 | " | " | tacky |

TABLE IV-continued

| Ex. No. | Rubber Base Material | Resin Ex. No. | Amount of Resin (as Parts Resin per 100 Parts Rubber) | Film Appearance | Quality of Film | Tack |
| --- | --- | --- | --- | --- | --- | --- |
| 65 | " | " | 40 | " | cracks | nil |
| 66 | " | " | 50 | " | good | some tack |
| 67 | cis-polybutadiene | 27 | 30 | clear | good | tacky-soft |
| 68 | " | " | 40 | " | " | " |
| 69 | " | " | 50 | " | " | some tack - soft |
| 70 | styrene-butadiene[1] block copolymer | " | 30 | " | " | some tack |
| 71 | " | " | 40 | " | cracks | nil |
| 72 | " | " | 50 | " | cracks and rough | " |
| 73 | styrene-isoprene[2] block copolymer | " | 30 | " | good | tacky |
| 74 | " | " | 40 | " | " | " |
| 75 | " | " | 50 | " | " | nil |
| 76 | natural rubber | 33 | 30 | " | " | tacky - soft |
| 77 | " | " | 40 | " | " | " |
| 78 | " | " | 50 | " | " | " |
| 79 | cis-polybutadiene | " | 30 | " | " | " |
| 80 | " | " | 40 | " | " | " |
| 81 | " | " | 50 | " | " | " |

[1]Sold under the trade designation "Kraton 1101"
[2]Sold under the trade designation "Kraton 1108"

EXAMPLE 82

A polyurethane pressure-sensitive adhesive was prepared by mixing 419 gms. of a block copolymer of ethylene glycol and propylene glycol having a molecular weight of about 3000 (sold under the trade designation "Pluronic L-81"), 120 gms. of polytetraethylene ether glycol capped with tolylene diisocyanate having a molecular weight of about 1300 (sold under the trade name "Adiprene L-167"), 216 gms. of toluene and 15.5 gms. of a five weight percent lead octoate/toluene solution. To 40.3 gms. of this mixture was added 2 gms. a sixty weight percent solution (in "Cellosolve" acetate and xylene) of trimethylol propane capped with tolylene diisocyanate (sold under the trade designation "Mondur CB-60") and 29.4 gms. of a fifty weight percent solution in toluene of the tackifier described in Example 25. The components of the adhesive composition were extremely compatible and the adhesive had excellent adhesion and tack.

What is claimed is:

1. A tacky adhesive composition comprising (1) 5 to 200 parts by weight poly(phenol/diene) resin having alternately repeating diene and phenol units, a glass transition temperature in the range 100° - 200° C and a number average molecular weight in the range 600 - 5000 produced by adding, in an inert atmosphere and in the presence of a Friedel-Crafts catalyst, 1 mole of non-conjugated diene with 1 - 1.75 mole of a phenolic compound having at least two ring carbon atoms susceptible of alkylation, at a temperature in the range of 20° - 130° C, maintaining the reactants at a temperature of about 130° C until the reaction is complete, and isolating the poly(phenol/diene) resin and (2) blended together with said resin about 100 parts by weight rubber selected from the group consisting of polychloroprene, chlorinated ethylene-propylene and poly(ethylene/propylene).

2. An article comprising a flexible self-supporting strip bearing a thin layer of the tacky adhesive composition of claim 1.

3. A tacky adhesive composition comprising 5 to 200 parts by weight of the poly(phenol/diene) resin of claim 1 wherein at least half but not sustantially all of the olefinic carbon atoms and carbon atoms bearing hydroxyl groups are hydrogenated blended together with about 100 parts polyurethane rubber.

4. A tacky adhesive composition comprising 5 to 200 parts by weight of the poly(phenol/diene) resin of claim 1 wherein substantially all of the olefinic carbon atoms and carbon atoms bearing hydroxyl groups are hydrogenated blended together with about 100 parts by weight hydrocarbon rubber.

* * * * *